United States Patent [19]

Cunningham et al.

[11] 4,417,614
[45] Nov. 29, 1983

[54] ABRASION ELIMINATING TIRE CHANGING TOOL

[75] Inventors: Charles L. Cunningham, Nashville; Robert E. Gwaltney, Brentwood, both of Tenn.

[73] Assignee: Hennessy Industries, Inc., La Vergne, Tenn.

[21] Appl. No.: 268,199

[22] Filed: May 29, 1981

[51] Int. Cl.³ .............................................. B60C 25/08
[52] U.S. Cl. .................................................. 157/1.24
[58] Field of Search .................... 157/1.17, 1.24, 1.26, 157/1.28, 1.3, 1.1

[56] References Cited

U.S. PATENT DOCUMENTS

| | | | |
|---|---|---|---|
| 4,133,363 | 1/1979 | Gardner | 157/1.3 |
| 4,230,170 | 10/1980 | Duquesne | 157/1.24 |
| 4,245,686 | 1/1981 | Holladay | 157/1.1 |
| 4,258,777 | 3/1981 | Duquesne | 157/1.24 |

Primary Examiner—James G. Smith
Attorney, Agent, or Firm—Wood, Dalton, Phillips, Mason & Rowe

[57] ABSTRACT

A tire changing tool (20) including a tool body (24) having a head (26) for performing a tire changing operation. The head has a first surface (32) for engagement with the bead of a tire and a second surface (34, 38, 42) adapted to face a wheel (36) to have a tire mounted thereon or demounted therefrom. A magazine (52) is provided which receives a solid abrasion eliminating material (58) and an opening (48) is provided in the second surface (34, 38, 42) and extends to the magazine. A feeding rod (60) is provided for feeding the material (58) from the magazine (52) through the opening (48).

10 Claims, 5 Drawing Figures

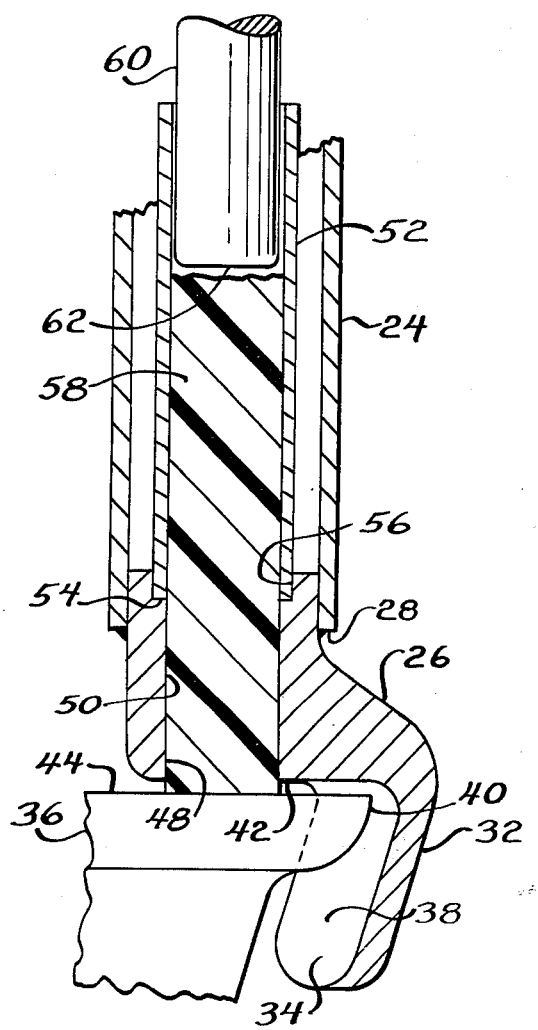
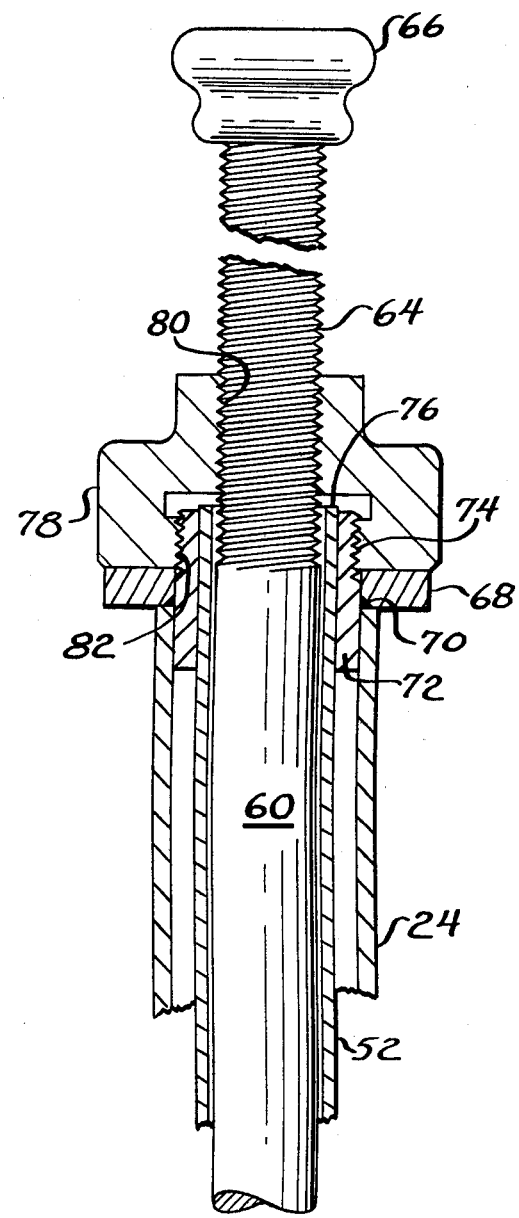
FIG. 2
FIG. 3

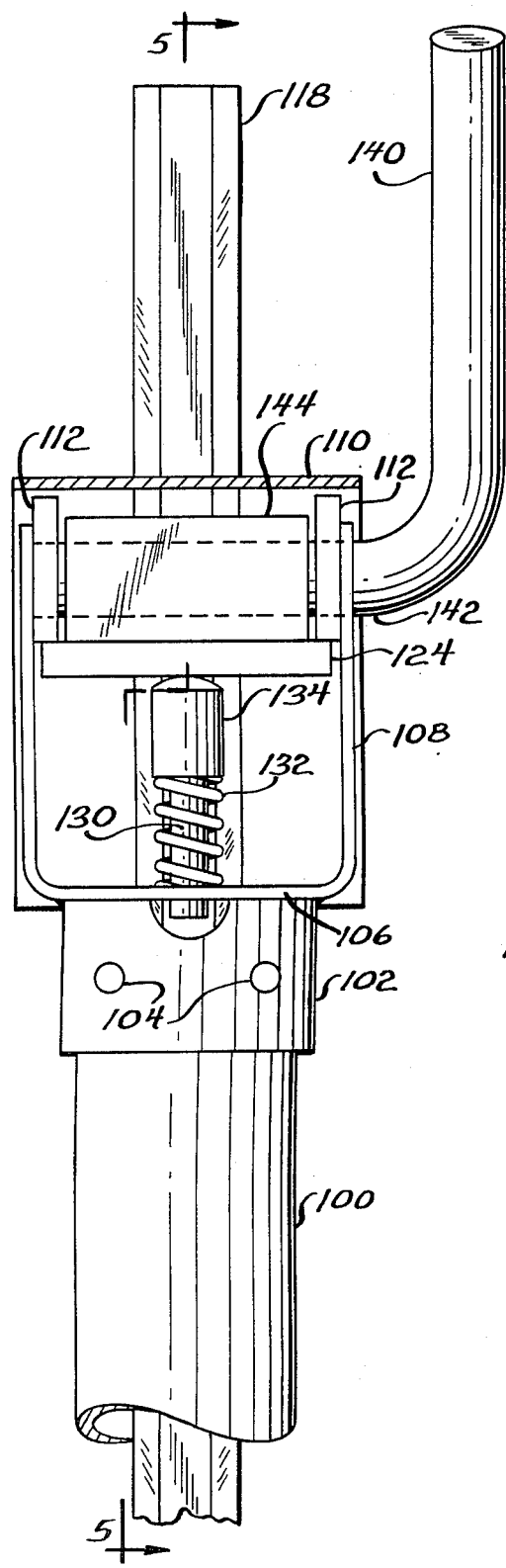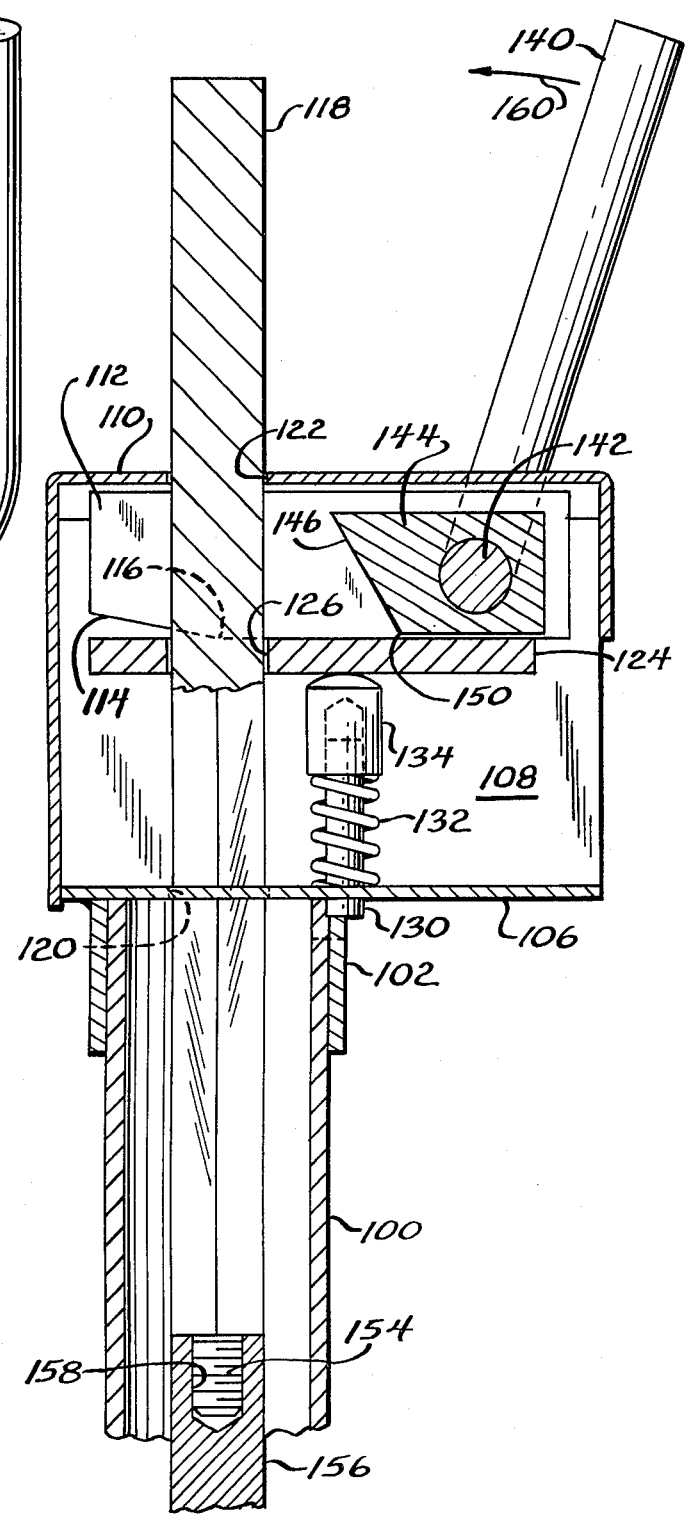

ABRASION ELIMINATING TIRE CHANGING TOOL

DESCRIPTION

1. Technical Field

This invention relates to a tire changing tool, and more specifically, to a tire changing tool that may be utilized in tire changing operations without fear of abrading or marring wheels.

2. Background Art

As is well known, for many years, tire changing tools have been utilized in connection with tire changers for mounting a tire on or demounting a tire from a wheel clamped on a tire changer. In a typical operation, relative movement is effected between the tool and the wheel, sometimes by rotating the tool relative to a fixed wheel mounted on a tire changer and other times, by rotating a wheel clamped on a rotary tire changing table relative to a fixed tool.

As the purpose of the tool is to move the tire bead past the wheel rim flange in either a mounting or demounting operation, the tool necessarily must be in close proximity to the wheel. In fact, in most cases, contact is made between the tool and the wheel.

With conventional wheels, such contact does not present a problem. However, in the case of decorative wheels, such contact results in abrasion of the wheel, marring its decorative surface.

In order to eliminate such abrasion, the prior art heretofore has taken two approaches. According to one, the tire changing tool is coated with plastic material such that only the plastic contacts the wheel. Since the plastic is much softer than the material of which the wheel is formed, there can be no abrasion. However, when the plastic coating wears off the tool, the tool must either be discarded or otherwise provided with a new coating. Either is not particularly economical.

A second prior art approach to avoiding abrasion involves the use of "booties" formed of plastic or the like. Such booties are removably disposed on the head of a tire changing tool and, when tires on decorative wheels are to be changed, the bootie is slipped in place on the tool and the tire changing operation performed. Only the plastic bootie contacts the wheel with the result that there is no abrasion. When a bootie wears out, it is simply replaced with another.

However, because booties are by nature removable from the tool head, not infrequently, in applying the tool to the tire and wheel, the bootie becomes dislodged with the consequence that the tool directly contacts the wheel and abrasion can result. Consequently, in utilizing booties, care must be taken at all times that they are properly placed on the tool head or else they do not serve their intended purpose.

DISCLOSURE OF THE INVENTION

The present invention is directed to overcoming one or more of the problems as set forth above.

According to the present invention, there is provided a tire changing tool including a tool having a head for performing a tire changing operation. The head has a first surface for engagement with the bead of a tire and a second surface adapted to face a wheel having a tire mounted thereon or demounted therefrom. A magazine is provided which receives a solid abrasion eliminating material and an opening is provided in the second surface which extends to the magazine. Means are provided for feeding the material from the magazine through the opening.

As a consequence of this construction, when the magazine is exhausted, it is only necessary to refill the same eliminating any need for discarding the tool. At the same time, because the material is provided from the magazine to the point of substantial abutment between the tool and the wheel, there is no concern that it will be dislodged inadvertantly resulting in abrading contact between the tool head and the wheel.

In a preferred embodiment, the tool has an elongated body and the magazine is disposed within the body. In one embodiment, the magazine comprises a tunnel which is adapted to receive the abrasion eliminating material in a rod-like form.

A highly preferred embodiment utilizes a feeding means comprising a pusher rod extending into the magazine oppositely of the opening in the tool head surface along with means for advancing the pusher rod into the magazine. The advancing means may comprise interengaging threads on the pusher rod and on the body and a handle is disposed on the pusher rod so that the pusher rod may be rotated to effect relative movement between the pusher rod and the body.

In a highly preferred embodiment, the tool is employed in a tire changer including a base, a wheel receiving and holding table located on the base, and with means for effecting relative movement between the table and the tool.

Other objects and advantages will become apparent from the following specification taken in connection with the accompanying drawings.

BRIEF DESCRIPTION OF THE DRAWINGS

FIG. 2 is a sectional view of one end of the tool, specifically, the end having a tire engaging head;

FIG. 3 is a sectional view of the tool illustrating the opposite end thereof;

FIG. 4 is a elevational view of a modified embodiment, and specifically, the end remote from the tool head; and FIG. 5 is a vertical view taken approximately along the line 5—5 of FIG. 4.

BEST MODES FOR CARRYING OUT THE INVENTION

Figure 1:
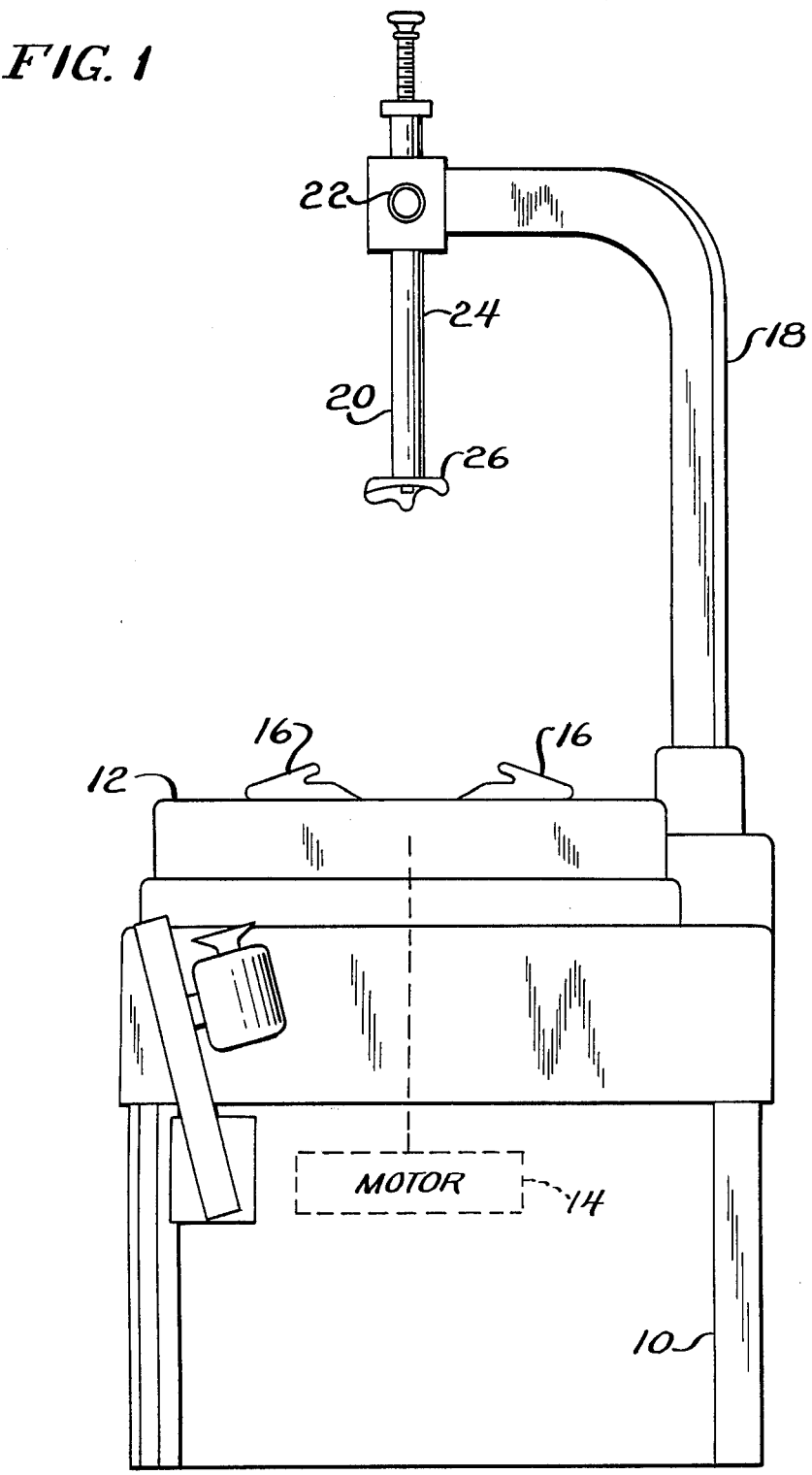
FIG. 1 is a side elevation of a tire changer utilizing a tool made according to the invention.

An exemplary embodiment of a tire changing tool made according to the invention is illustrated in FIG. 1 in connection with a tire changer. The tire changer includes a base 10 rotatably mounting, by any suitable means, a tire receiving and holding table 12. The table 12 may be rotated by a motor 14 and includes on its upper surface, wheel clamps 16 for engaging and grasping the rim flanges of a wheel during a tire mounting or demounting operation.

An inverted L-shaped arm 18 extends upwardly from the base 10 and at its extremity, reciprocally receives an elongated tire changing tool 20. Suitable clamping means 22 may be utilized to hold the tool 20 in any desired position of vertical adjustment. Other means, conventional in nature and not shown, may movably mount the arm 18 so as to provide for adjustment of the tool 20 towards and away from the center of the table in the horizontal direction to compensate for various wheel sizes. The general organization of the tire changer described thus far is conventional and may be readily ascertained from the prior art.

As seen in FIG. 1, the tool 20 is basically formed of an elongated body 24 mounting at one end, a tire engaging head 26. Referring to FIG. 2, the body 24 may be formed of tubular metal and while not shown in FIG. 2, may be rectangular in cross section so as to prevent the same from twisting within a tool receiving opening (not shown) in the arm 18.

The head 26 may be formed of a metal casting or the like and is received in an end 28 of the body 24 and secured in place as by welding 30. The precise configuration of the head 26 forms no part of the invention as a variety of differing head configurations are well known in the art. In each, the head 26 will have a surface 32 for engagement with the bead of a tire during a mounting or demounting operation and an opposite surface 34 that will face a wheel 36 on the tire changer. The surface 34 which faces the wheel 36 will generally be composed of two parts. A first part 38 extends past the rim flange 40 of the wheel toward the drop center (not shown) of a typical wheel, while the second part 42 of the surface 34 will typically be adjacent a side 44 of the rim flange of the wheel 36. The second part 42 of the surface 34, by reason of its facing the side 44 of the wheel 36, is the side most apt to abrade a decorative surface on the wheel 36 as will be readily recognized by those skilled in the art. Accordingly, the same is provided with an opening 48 defined by one end of a bore 50 in the head 26. The bore 50 extends through the head 26 to open into the interior of the body 24.

Within the body 24, there is disposed an elongated tube 52 having an end 54 snugly received in an annular recess 56 surrounding the bore 50. The tube 52 defines a tunnel within the body which in turn serves as a magazine for an abrasion eliminating material. In a preferred embodiment, the abrasion eliminating material is in solid form and configured in the shape of a rod 58 formed of plastic or the like. The plastic employed may be the same utilized in the manufacture of prior art booties, the essential characteristic of the same being that it is sufficiently soft that it will not mar, by abrasion, a decorative wheel.

Preferably, the rod of material 58 and the tube 52 are configured such that there is a slight interference fit between the two. That is, at least one cross sectional dimension of the rod 58 will be slightly greater than the corresponding cross sectional dimension of the tube 52 to prevent the rod from freely sliding within the tube 52.

Also received within the tube 52 is a pusher rod 60, one end 62 of which is illustrated in FIG. 2. As illustrated, the end 62 bears against the rod 58 such that the pusher 60 may be utilized to urge the rod 58 out of the opening 48 as shown in FIG. 2. In operation, the pusher rod 60 is utilized to insure that the rod 58 extends sufficiently out of the opening 48 so as to engage the side 44 of the wheel 36 and prevent the part 42 of the surface 34 o the tool head 26 from directly contacting the wheel 36.

As best illustrated in FIG. 3, the upper end of the pusher rod 60 is threaded as at 64 and terminates in a handle 66.

An apertured end plate 68 is mounted to the end of the body 24 remote from the head 26 against a bushing 72, threaded at its upper end as shown at 74, which is secured to the body 24 by any suitable means as welding 70 and serves to receive the end 76 of the tube 52 opposite the end 54.

A cap nut 78 includes a first threaded bore 80 receiving the threaded end 64 of the pusher rod 60 and a larger threaded bore 82 threaded to the bushing 72. As a consequence of this construction, the pusher rod 60 is retained within the tube 52 and, when the handle 66 is rotated, the pusher rod 60 will advance within the tube 52 to urge the rod 58 out of the opening 48. When the supply of the rod 58 is exhausted, it is only necessary to remove the cap nut 78 along with the pusher rod 60 and insert a new rod of abrasion eliminating material into the tube 52. The pusher rod 60 and the cap nut 78 are then replaced.

A modified, and highly preferred, embodiment of the invention is illustrated in FIGS. 4 and 5. Actually, FIGS. 4 and 5 illustrate only the upper end of the tool and not the head end of the same, the latter being substantially as shown in FIG. 2 with the exception that the tube 52 may be eliminated if desired. The embodiment of FIGS. 4 and 5 is adapted to be utilized with the tire changer of FIG. 1 in such a way that the clamp 22 (FIG. 1) may be omitted in favor of allowing the tool body 24 to freely slide vertically within a suitable opening at the upper end of the arm 18. In the same connection, the arm 18 is preferably freely pivotal about the vertical axis at its point of connection to the base 10 and these two features of the tool illustrated in FIGS. 4 and 5 and the tire changer illustrated in FIG. 1 allow the tool head 26 to track the rim flange of a wheel during a mounting operation as the table 12 is rotated notwithstanding distortions in the wheel, as for example, bent rim flanges. With the foregoing in mind, the embodiment of FIGS. 4 and 5 will be described.

Like the embodiment of FIG. 2, the embodiments of FIGS. 4 and 5 include a tool body formed of a metal tube 100 of rectangular cross section, the interior of which serves as a magazine. Spaced side plates 102 are secured to the upper end of the body 100 as by screws 104 and are secured as by welding the underside 106 of a U-shaped channel 108. A sheet metal cover 110 having the configuration illustrated in FIGS. 4 and 5 is utilized to close the top of the channel 108 as well as one end thereof; and to partially close the other end of the channel 108.

At opposed locations near the upper side of the channel 108, there are located identical side plates 112 which are secured to the channel 108 as by welding. As best seen in FIG. 5, the lefthand part of the underside of each of the side plates 112 is tapered as at 114 to define a pivot point 116 which is substantially aligned with the vertical center line of a push rod 118.

As seen in FIG. 4, the push rod 118 is disposed between the two side plates 112 and as seen in FIG. 5, extends from the tube 100 upwardly through an opening 120 in the underside 106 of the channel 108. The push rod 118 likewise extends upwardly through an opening 122 in the cover plate 110.

Within the channel 108 and disposed in a generally horizontal plane is a wedge, cam or lock plate 124. As seen in FIG. 5, the lock plate 124 includes an opening 126 through which the push rod 118 extends. The opening 126 has a shape complimentary to that of the push rod 118 and accordingly is hexagonal.

Within the channel 108, a post 130 is secured to the bottom 106 as by welding. A compression coil spring 132 surrounds the post and abuts the upper surface of the channel bottom 106. Reciprocally received on the post 130 is a cap 134 which is urged by the spring 132 against the underside of the lock plate 124. Thus, the lock plate will normally assume a horizontal position in abutment with the horizontal undersides of the side plates 112.

An L-shaped handle 140 has a horizontal end 142 extending between and journalled in suitable apertures in the side plates 112. Between the side plates, the handle end 142 mounts a cam block 144 having a cam surface 146. It will be appreciated from FIG. 5 that if the handle 140 is pivoted in the counterclockwise direction, the cam surface 146 will engage the lock plate 124 and begin to drive the same downwardly causing the lockplate 124 to pivot in the clockwise direction about the pivot point 116 by reason of the cap 134 continuing to urge the lock plate 124 upwardly. Specifically, such initial motion occurs by reason of a first point 150 on the cam surface 146 engaging the lock plate 124 to the right of the point of upward bias application provided by the cap 134.

As alluded to previously, in the embodiment shown in FIGS. 4 and 5, the tube 52 employed in the embodiment of FIG. 2 may be eliminated if desired. Since the tube 52 in the first embodiment prevents the plastic rod 58 therein from falling out of the aperture 48, other means are provided in the embodiment of FIGS. 4 and 5 for the same purpose. Specifically, the lower end of the push rod 118 is provided with a reduced diameter, threaded stud 154. The upper end of a plastic rod 156 similar to the rod 58 is provided with a bore 158 whereby the rod 156 may be threaded onto the pusher rod 118.

Operation of the embodiment of FIGS. 4 and 5 is as follows. With a wheel secured to the tabletop 12 (FIG. 1), the arm 118 is swung until the tool head 26 is brought into a proper radial position with respect to the wheel. The tool 20, which in this embodiment is freely slidable within the arm 18, is first lifted and then allowed to descend such that the part 42 of the surface 34 facing the wheel engages the side 44 of the wheel. During this positioning operation, no relative movement under power between components occurs and the only contacting force applied to the wheel at this point is that caused by the weight of the tool itself.

The handle 140 is then moved in a counterclockwise direction as indicated by an arrow 160 in FIG. 5. This firstly causes the lock plate 124 to cant, i.e., pivot in a clockwise direction about the point 116, thereby locking itself to the pusher rod 118. Continued counterclockwise movement of the handle 140 will cause a downward force to be applied to the lock plate 124 and thus to the push rod 118 which is now locked thereto. However, since the initial set-up will have resulted in the plastic rod 156 being brought into contact with the side 44 of the wheel, the push rod 118 will not move downwardly as such downward movement is blocked by the wheel. Rather, the push rod 118 will remain stationary and the oppositely directed reactive force will cause the handle 140 to move slightly upwardly carrying the channel 106, the tool body 100 and the tool head 26 with it.

When the handle 140 has been moved to its counterclockwisemost position, the cam surface 146 will be in abutment with the lock plate 124 over a substantial area and serve to maintain the lockplate 124 canted on the push rod 118 thereby maintaining the tool head in the slightly raised position generated by the action mentioned earlier. This will result in orientation of components substantially as shown in FIG. 2. That is, the wheel facing surface 34 of the tool head 26, and particularly the part 42 thereof, will be spaced upwardly from the edge 44 of the wheel 36 so that abrading or appearance marring contact between the tool head and the wheel is avoided when relative motion is effected between the tool head and the wheel.

It will be observed that the embodiment of FIGS. 4 and 5 provide a means of feeding the plastic rod 156 in such a way that there is never too much or too little of the rod projecting through the aperture 48 in the tool head 26. At the same time, proper spacing between the tool head and the side of the wheel is always provided.

INDUSTRIAL APPLICABILITY

From the foregoing, it will be appreciated that a tire changing tool made according to the invention may be used with efficacy and the changing of tires mounted on decorative wheels without fear of marring their appearance. The unique construction of the tool allows ready replacement of the abrasion elminating material when the supply thereof is exhausted without requiring that the tool be discarded or recoated. At the same time, the abrasion eliminating material cannot be inadvertently dislodged during use resulting in abrasion of decorative wheels. The provision of a magazine for receiving the abrasion eliminating material permits the tool to be used over extended periods without concern for wear on the abrasion eliminating material since, when wear occurs, it is only necessary to advance more of such material out of the magazine through the opening 48.

We claim:

1. In a tire changer including a base, a wheel receiving and holding table on the base, a tire changing tool including a head having a first surface for engagement with a tire to be mounted and/or demounted and a second surface facing a wheel when a wheel is mounted on a table, and means for effecting relative movement between the table and the tool, the improvement wherein said tool includes a magazine for receipt of a solid plastic-like abrasion eliminating material, an aperture in said second surface extending to said magazine so that abrasion eliminating material in said magazine may be conveyed to said second surface, and means for feeding abrasion eliminating material in said magazine to said aperture.

2. The tire changer of claim 1 wherein said tool includes an elongated body and said magazine is disposed within said body.

3. The tire changer of claim 2 wherein said abrasion eliminating material is adapted to be in rod-like form and said magazine comprises an elongated tunnel having at least one cross sectional dimension somewhat less than the corresponding cross sectional dimension of the abrasion eliminating material so as to frictionally grasp said abrasion eliminating material and prevent the same from appreciably moving within said magazine except upon operation of said feeding means.

4. The tire changer of claim 1 wherein said feeding means is manually operated.

5. The tire changer of claim 1 wherein said feeding means comprises a pusher rod located on said tool oppositely of said aperture and extending into said magazine, and means for advancing said pusher rod into said magazine.

6. A tire changing tool comprising:
an elongated tool body;

a tire engaging head on at least one end of said tool, said head having a first surface for engagement with the bead of a tire, and a second surface adapted to face a wheel having a tire mounted thereon or demounted therefrom;

a magazine within said tool body for receiving solid abrasion eliminating material;

an opening in said second surface extending to said magazine; and means for feeding said material from said magazine through said opening;

whereby said abrasion eliminating material may be interposed between said second surface and a wheel to prevent abrading or marring contact between the wheel and the tool.

7. The tool of claim 6 wherein said magazine comprises a tunnel within said body adapted to receive said material in rod-like form.

8. The tool of claim 6 wherein said feeding means comprises a pusher rod extending into said magazine oppositely of said opening, and means for advancing said pusher rod into said magazine.

9. The tool of claim 8 wherein said advancing means comprise interengaging threads on said pusher rod and said body, and a handle on said pusher rod whereby the same may be rotated to effect relative movement between said pusher rod and said body.

10. The tool of claim 8 wherein said advancing means comprise a cam operated lock plate engaging said pusher rod.

* * * * *